(12) United States Patent
Tsai et al.

(10) Patent No.: US 11,822,085 B2
(45) Date of Patent: Nov. 21, 2023

(54) OPTICAL ADAPTIVE DEVICE AND WEARABLE DEVICE

(71) Applicant: Advanced Semiconductor Engineering, Inc., Kaohsiung (TW)

(72) Inventors: Ko-Fan Tsai, Kaohsiung (TW); Tien-Chia Liu, Kaohsiung (TW); Kuo Sin Huang, Kaohsiung (TW); Cheng-Te Chou, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 17/467,132

(22) Filed: Sep. 3, 2021

(65) Prior Publication Data
US 2023/0074105 A1  Mar. 9, 2023

(51) Int. Cl.
  *G02B 27/01* (2006.01)
  *G02F 1/29* (2006.01)

(52) U.S. Cl.
  CPC ..... *G02B 27/0172* (2013.01); *G02B 27/0179* (2013.01); *G02F 1/29* (2013.01); *G02B 2027/0187* (2013.01)

(58) Field of Classification Search
  CPC ............. G02B 27/0101; G02B 27/017; G02B 2027/0118; G02B 2027/012; G02B 2027/0121; G02B 2027/015; G02B 2027/0187; B60R 2300/205; G03B 21/604
  See application file for complete search history.

(56) References Cited

U.S. PATENT DOCUMENTS

| | | | |
|---|---|---|---|
| 10,901,205 B1* | 1/2021 | Lu | G02B 27/017 |
| 2019/0346679 A1* | 11/2019 | Miller | G02B 26/02 |
| 2020/0379214 A1* | 12/2020 | Lee | G02B 7/287 |
| 2021/0080763 A1* | 3/2021 | Sulai | G02B 5/3025 |
| 2021/0173474 A1* | 6/2021 | Sztuk | G06T 19/006 |

* cited by examiner

*Primary Examiner* — Mariam Qureshi
(74) *Attorney, Agent, or Firm* — FOLEY & LARDNER LLP

(57) ABSTRACT

The present disclosure provides an optical adaptive device and a wearable device. The optical adaptive device includes a carrier, a first light adjusting element, and a second light adjusting element. The first light adjusting element is in or on the carrier and configured to focus a first light from a first article on a visual area. The second light adjusting element is in or on the carrier and configured to focus a second light from a second article on the visual area. The second article is further away from the area than the first article.

9 Claims, 6 Drawing Sheets

OPTICAL ADAPTIVE DEVICE AND WEARABLE DEVICE

BACKGROUND

1. Technical Field

The present disclosure generally relates to an optical adaptive device and a wearable device.

2. Description of the Related Art

Augmented reality (AR) devices have become increasingly popular. However, AR devices may have some problems, such as the visual aberrations that occur when superimposing computer generated images onto real-world images, and the defocusing that occurs when lights pass through a curved lens.

SUMMARY

In one or more embodiments, an optical adaptive device includes a carrier, a first light adjusting element, and a second light adjusting element. The first adjusting element is in or on the carrier and configured to focus a first light from a first article on a visual area. The second light adjusting element is in or on the carrier and configured to focus a second light from a second article on the visual area. The second article is further away from the area than the first article.

In one or more embodiments, an optical adaptive device includes a first light adjusting element, a second light adjusting element, and a transparent panel. The transparent panel is disposed between the first light adjusting element and the second light adjusting element. The transparent panel is configured to generate a first light. The first light adjusting element is configured to adjust a path of the first light. The second light adjusting element is configured to adjust a path of a second light.

In one or more embodiments, a wearable device includes a first optical element and a first panel. The first panel is disposed adjacent the first optical element. The first optical element is configured to focus a first light generated from the first panel and configured to focus a second light passing through the first panel.

BRIEF DESCRIPTION OF THE DRAWINGS

Aspects of the present disclosure will be readily understood from the following detailed description when read with the accompanying figures. It should be noted that various features may not be drawn to scale. The dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
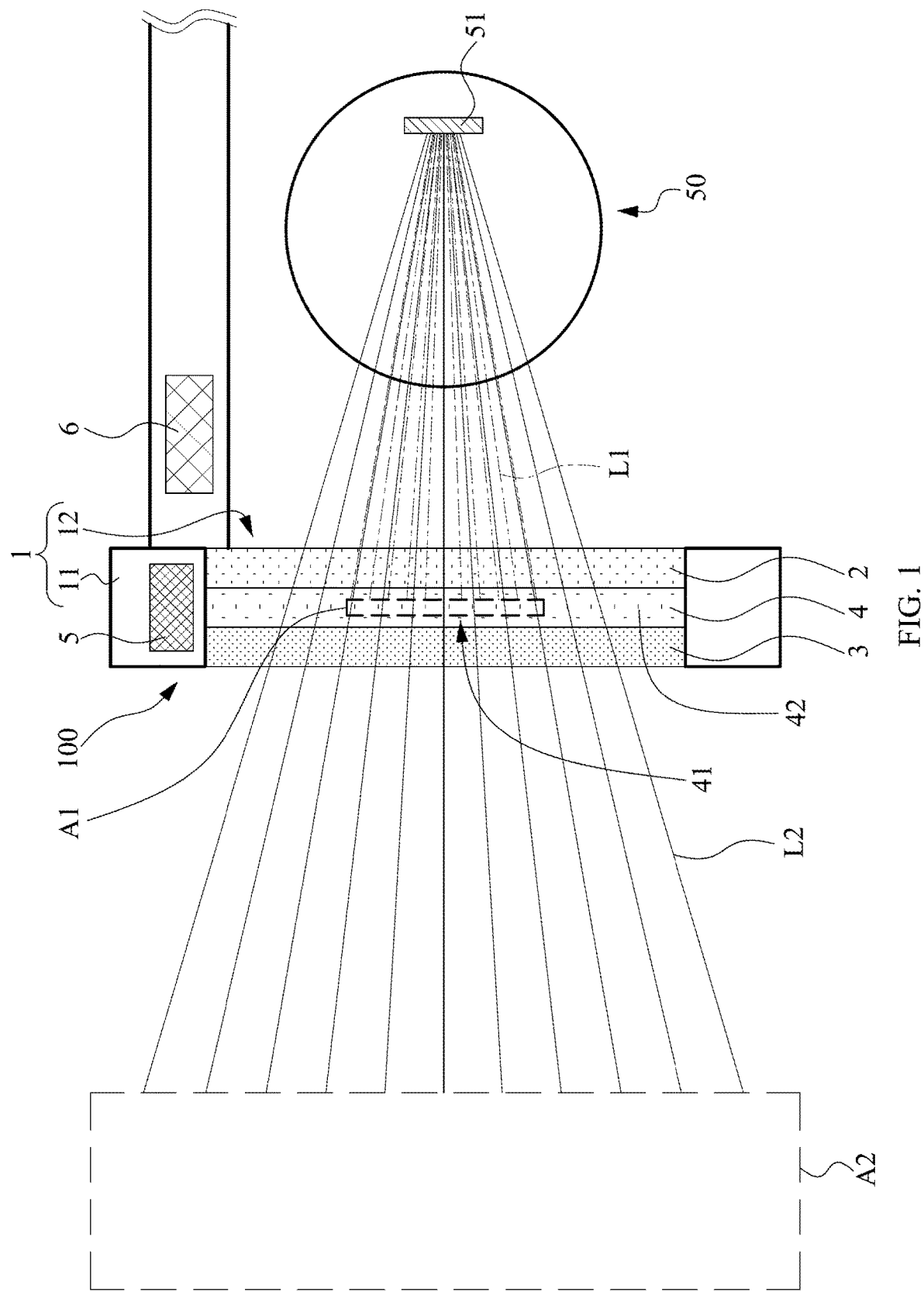
FIG. 1 is a diagram of an optical adaptive device and an object in accordance with some embodiments of the present disclosure.

The following disclosure provides for many different embodiments, or examples, for implementing different features of the provided subject matter. Specific examples of components and arrangements are described below. These are, of course, merely examples and not intended to be limiting. In the present disclosure, reference to the formation of a first feature over or on a second feature in the description that follows may include embodiments in which the first and second features are formed in direct contact, and may also include embodiments in which additional features may be formed between the first and second features, such that the first and second features may not be in direct contact. The present disclosure may repeat reference numerals and/or letters in the various examples. This repetition is for simplicity and clarity and does not in itself dictate a relationship between the various embodiments and/or configurations discussed.

Embodiments of the present disclosure are discussed in detail below. It should be appreciated, however, that the present disclosure provides many applicable concepts that can be embodied in a wide variety of specific contexts. The specific embodiments discussed are merely illustrative and do not limit the scope of the disclosure.

FIG. 1 is a diagram of an optical adaptive device 100 and an object 50 in accordance with some embodiments of the present disclosure. The optical adaptive device 100 may include a glass, a contact lens, a telescope, a camera, an augmented reality (AR) device, mixed reality (MR) device, or visual reality (VR) device. The optical adaptive device 100 may include a carrier 1, a light adjusting element 2, a light adjusting element 3, and a panel 4, an eye tracking component 5, and a processor 6.

The carrier 1 may include a supporting portion 11 configured and a hollow portion 12 enclosed by the supporting portion 11. In some embodiments, the supporting portion 11 may be in contact with the object 50. The hollow portion 12 may be configured to accommodate optical elements or electronic elements, such as the light adjusting element 2, the light adjusting element 3, and the panel 4. In some embodiments, the carrier 1 may include a frame, glass, a helmet, a face shield, a cap, a mask, hair accessories, or others.

The light adjusting element 2 may be an optical element. For example, the light adjusting element 2 may include a focusing element. The light adjusting element 2 may be mounted to the carrier 1. The light adjusting element 2 may be disposed on or in the carrier 1. The light adjusting element 2 may be accommodated by the hollow portion 12 of the carrier 1. The light adjusting element 2 may be enclosed by the supporting portion 11 of the carrier 1. The light adjusting element 2 may have a substantially flat surface. The light adjusting element 2 may be configured to be electrically adjustable. The light adjusting element 2 may be electrically connected to the processor 6 by wire or wirelessly. The light adjusting element 2 may be configured to adjust the characteristics of a light, such as the path, phase, wavelength (or frequency), speed, direction, etc. The light adjusting element 2 may include a spatial light modulator (SLM), a tunable lens, or the like. For example, the SLM of the light adjusting element 2 may include a liquid-crystal (LC) structure configured to be oriented by electricity, e.g., an electrical signal transmitted by the processor 6. For example, a central portion of the LC structure may orient in a direction substantially parallel to the propagation direction of the light, while an outer portion of the LC structure may orient in a direction substantially perpendicular to the propagation direction of the light. In this case, the light adjusting element 2 may function as a concave lens. As such, the characteristics (e.g., the speed) of a light propagating through the light adjusting element 2 may be altered. For example, the tunable lens of the light adjusting element 2 may include a lens membrane configured to be deformed by releasing or injecting the fluid from the cavity defined by the lens membrane. The light adjusting element 2 may function as a concave lens when the fluid is released from the cavity. As such, the characteristics (e.g., the speed) of a light propagating through the light adjusting element 2 may be altered.

The light adjusting element 3 may be an optical element. For example, the light adjusting element 3 may include a focus element. The light adjusting element 3 may be mounted to the carrier 1. The light adjusting element 3 may be disposed on or in the carrier 1. The light adjusting element 3 may be accommodated by the hollow portion 12 of the carrier 1. The light adjusting element 3 may be enclosed by the supporting portion 11 of the carrier 1. The light adjusting element 1 may be physically separated from the light adjusting element 2. In an alternative embodiment, the light adjusting element 2 and the light adjusting element 3 may be formed in one piece. The light adjusting element 3 may have a substantially flat surface. The light adjusting element 3 may be configured to be electrically adjustable. The light adjusting element 3 may be electrically connected to the processor 6 by wire or wirelessly. The light adjusting element 3 may be configured to adjust the characteristics of a light, such as the path, phase, wavelength (or frequency), speed, direction, etc. The light adjusting element 3 may include a spatial light modulator (SLM), a tunable lens, or the like. For example, the SLM of the light adjusting element 3 may include an LC structure configured to be oriented by electricity, e.g., an electrical signal transmitted by the processor 6. For example, a central portion of the LC structure may orient in a direction substantially parallel to the propagation direction of the light, while an outer portion of the LC structure may orient in a direction substantially perpendicular to the propagation direction of the light. In this case, the light adjusting element 3 may function as a concave lens. As such, the characteristics (e.g., the speed) of a light propagating through the light adjusting element 3 may be altered. For example, the tunable lens of the light adjusting element 3 may include a lens membrane configured to be deformed by releasing or injecting the fluid from the cavity defined by the lens membrane. The light adjusting element 2 may function as a concave lens when the fluid is released from the cavity. As such, the characteristics (e.g., the speed) of a light propagating through the light adjusting element 3 may be altered.

The panel 4 may be a transparent panel. The transparent panel 4 may be mounted to the carrier 1. The transparent panel 4 may be accommodated by the hollow portion 12 of the carrier 1. The transparent panel 4 may be enclosed by the supporting portion 11 of the carrier 1. The transparent panel 4 may have a substantially flat surface. The transparent panel 4 may be disposed between the light adjusting element 2 and the light adjusting element 3. The transparent panel 4 may be disposed adjacent the light adjusting element 2 and the light adjusting element 3. In some embodiments, the light adjusting element 2, the light adjusting element 3, and the transparent panel 4 may be formed in one piece. The transparent panel 4 may be in contact with the light adjusting element 2 and/or the light adjusting element 3. The transparent panel 4 may be electrically connected to the processor 6 by wire or wirelessly. The transparent panel 4 may be transparent to a visible light, an infrared light, an ultraviolet light, or the like. The transparent panel 4 may be configured to generate a visual image thereon in response to an electrical signal from the processor 6. The transparent panel 4 may be configured to emit a light.

As shown in FIG. 1, the transparent panel 4 may be configured to generate a light L1. The light L1 may be emitted by an article A1 on the transparent panel 4. The article A1 may include a visual image on the transparent panel. The article A1 may be generated in response to an electrical signal transmitted from the processor 6. The article A1 may include an icon, visual content, or figures. The light L1 may be propagated in a direction toward the light adjusting element 2. The light L1 may be configured to pass through the light adjusting element 2. The light adjusting element 2 may be configured to adjust the characteristics of the light L1. The light adjusting element 2 may be configured to adjust a phase or a path of the light L1. Furthermore, the light adjusting element 2 may be configured to focus the light L1 on an area 51 of the object 50. The visual area 51 may be also referred as a visual area in the following descriptions. The visual area 51 may be a retina of a user, an eye of a user, or an optical receiving port of a robot.

The size of the light adjusting element 2 and the size of the light adjusting element 3 may be substantially the same. The central axis of the light adjusting element 2 and the central axis of the light adjusting element 3 may be substantially aligned with each other. In an alternative embodiment, the size of the light adjusting element 3 may be greater than the light adjusting element 2. In this case, the light adjusting element 2 may have a first central axis and the light adjusting element 3 may have a second central axis which is shifted from the first central axis.

The optical adaptive device 100 may be configured to receive a light L2 generated by an article A2. The article A2 may be an object (or a physical object) or a visual image. The physical object may be further away from the visual area 51 of the organ 50 (e.g., the eye of the user) than the transparent panel 4. In some embodiments, there may be a plurality of articles in the environment that generate or reflect lights, respectively. The optical adaptive device 100 may be configured to receive the lights generated by the plurality of articles. The light L2 may pass through the transparent panel 4. The light L2 may pass through the article A1 on the transparent panel 4. The transparent panel 4 may include a projecting region 41 having the article A1 and a transparent region 42 adjacent the projecting region. The projecting region 41 may be configured for generating the light L1 associated with the article A1. The light L2 may pass through the transparent region 42 of the transparent panel 4. The transparent region 42 may not include a visual image. The light L2 may bypass the transparent region 42. The light L2 may pass through the light adjusting element 3 and/or the transparent panel 2. The light adjusting element 3 may be configured to adjust the characteristics of the light L2. The light adjusting element 2 and the light adjusting element 3 may be configured to collaboratively adjust the characteristics of the light L2. The light adjusting element 3 may be configured to adjust a phase or a path of the light L2. The light adjusting element 2 and the light adjusting element 3 may be configured to collaboratively adjust the phase or a path of the light L2. Furthermore, the light adjusting element 3 may be configured to focus the light L2 on an area 51 of the object 50. The light adjusting element 2 and the light adjusting element 3 may be configured to collaboratively focus the light L2 on the visual area 51. In some embodiments, the light adjusting element 2 and the light adjusting element 3 may be configured to respectively focus the light L1 and the light L2 on the visual area 51 simultaneously. The light adjusting element 2 may be configured to focus the light L1 generated from the transparent panel 4 and focus the light L2 passing through the transparent panel 4. In some embodiments, the images of the article A1 and the object A2 may be focused at the same field of view (FOV) at the same time. The images of the article A1 and the object A2 may be focused on one retina of a user.

In some embodiments, the light L2 may pass through the light adjusting element 2 without changing the characteristics (e.g., the path, phase, focus) of the light L2. In other words, the characteristics of the light L2 may remain substantially the same before and after passing through the light adjusting element 2.

In some comparative embodiments, an AR device may be worn by a user and include a lens system and a transparent panel. The lens system may be unable to simultaneously focus the light emitted from an external object and the second light emitted from a visual image of the transparent panel because of the different depth of field (DOF) of the external object and the visual image. In addition, the lens system may have relatively large volume, such that the overall size and weight of the AR device cannot be reduced. Furthermore, the lens system may result in a defocus of the light emitted from the visual image because of the innate curved structure of the lens system.

In the present disclosure, the optical adaptive device 100 may be configured to simultaneously focus the lights from different articles (e.g., the light L1 and the light L2) on the visual area 51 (e.g., the eye of the user) with the adjustment capability of the light adjusting element 2 and the light adjusting element 3. The phase of the light L1 may be compatible with the phase of the light L2. As such, the images of the article A1 (e.g., the visual image) and the article A2 (e.g., the physical object) can superimpose without any visual aberration. Furthermore, owing to the substantially flat surfaces of the light adjusting element 2, the light adjusting element 3, and the transparent panel 4, the light L1 and the light L2 may precisely focus on the visual area 51 without any distortion or defocus similar to that caused by the curved structure of the comparative embodiments. Additionally, the substantially flat structure of the light adjusting element 2, the light adjusting element 3, and the transparent panel 4 is relatively small in volume as compared to the lens system of the comparative embodiments.

The eye tracking component 5 (or a wavefront sensing component) may be disposed on the supporting portion 11 of the carrier 1. The eye tracking component 5 may be electrically connected to the processor 6. The eye tracking component 5 may be configured to track a viewing focus of the eye of the user or the wavefront of the light reflected from the eye of the user. The processor 6 may be disposed on the supporting portion 11 of the carrier 1. The processor 6 may be configured to control at least one of the light adjusting element 2 and/or the light adjusting element 3 in response to the information of the viewing focus or the wavefront of the reflected light of the eye. The light adjusting element 2 and/or the light adjusting element 3 may be configured to adjust the phase or the direction of the light to be received by the user's eye to compensate for aberration of the user's eye. Thus, the optical adaptive device 100 may be able to correct aberration of the eye. As such, a user with some eye disorder (e.g., near-sightedness or far-sightedness) may directly use the optical adaptive device 100 without wearing a contact lens.

The eye tracking component 5 may include a light emitter and a light sensor. The eye tracking component 5 may include an infrared (IR) light emitter and an IR light emitter. The eye tracking component 5 may include a light emitter and a wavefront sensor. The light emitter configured to emit a first wave. The first wave may be reflected by the user's eye to be a second wave. The light sensor or the wavefront sensor configured to receive the second wave. The optical adaptive device 100 may be configured to determine, based on the first wave and the second wave, at least one of: a location of the user's eye, a movement of the user's eye, or the viewing focus of the user's eye.

Figure 2:
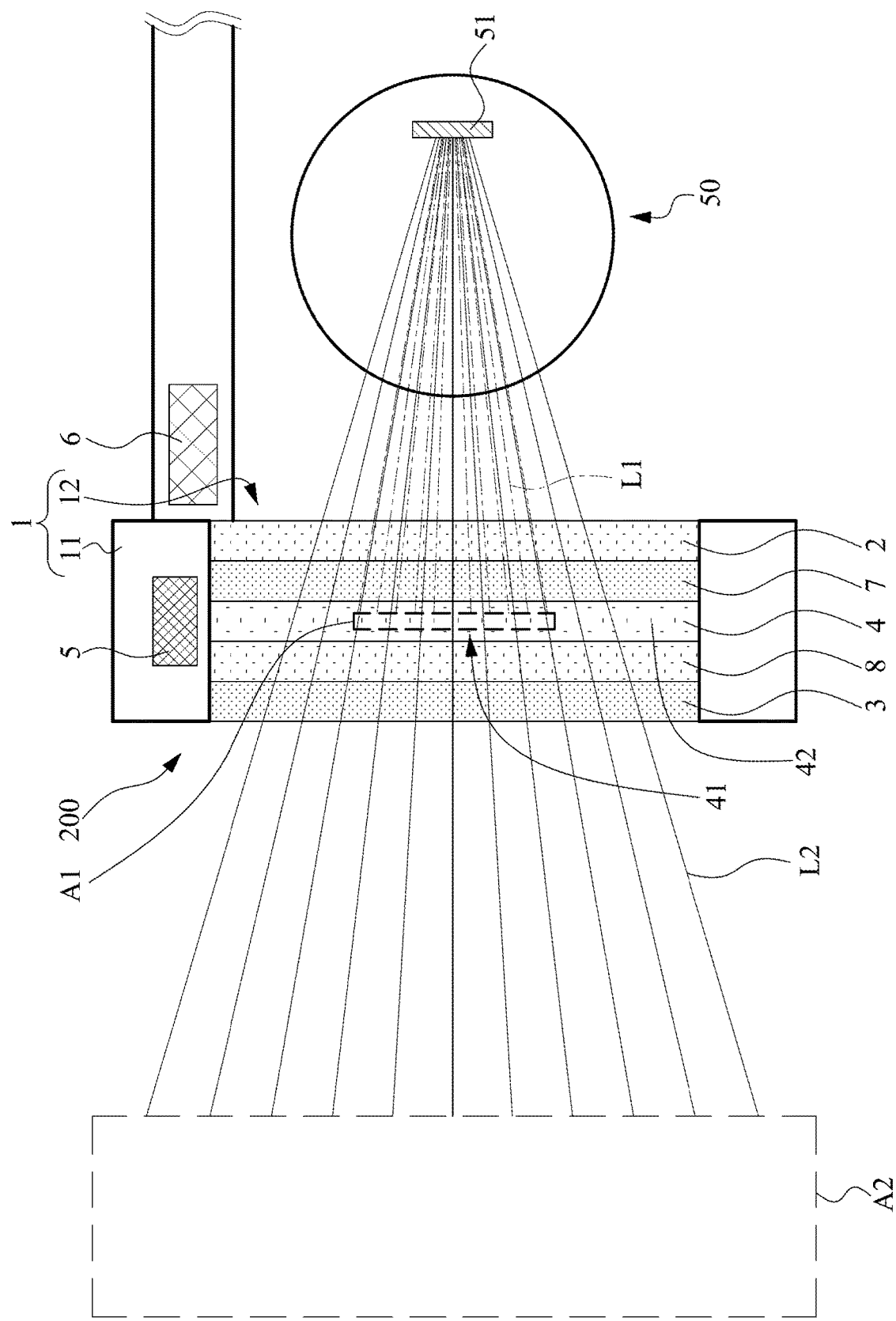
FIG. 2 is a diagram of an optical adaptive device and an object in accordance with some embodiments of the present disclosure.

FIG. 2 is a diagram of an optical adaptive device 200 and the object 50 in accordance with some embodiments of the present disclosure. The optical adaptive device 200 of FIG. 2 is similar to the optical adaptive device 100 of FIG. 1, with differences therebetween as follows.

The optical adaptive device 200 may further include an optical element 7 and an optical element 8. The optical element 7 may be disposed between the transparent panel 4 and the light adjusting element 2. The optical element 7 may be configured to adjust the characteristics of the light L1. For example, the optical element 7 may include a polarizer configured to adjust the phase of the light L1. The optical element 7 may be configured to adjust the characteristics of the light L2. For example, the optical element 7 may include a polarizer configured to adjust the phase of the light L2. The optical element 8 may be disposed between the transparent panel 4 and the light adjusting element 3. The optical element 8 may be configured to adjust the characteristics of the light L2. For example, the optical element 8 may include a polarizer configured to adjust the phase of the light L2. The optical element 7 and the optical element 8 may reduce the phase difference caused by the assembly procedure of the light adjusting elements 2 and 3. Furthermore, the optical element 7 and the light adjusting element 2 may be configured to collaboratively adjust the phase of the light L1. That is, the light adjusting element 2 may be responsible for only a part of the phase adjustment for the light L2. As such, the processor 6, which is configured to control the light adjusting element 2, may transmit fewer electrical signals to the light adjusting element 2, and thus the computing of the processor 6 may be less complex and thus the data processing speed of the processor 6 can be improved.

In addition, the optical element 8 and the light adjusting element 3 may be configured to collaboratively adjust the phase of the light L2. That is, the light adjusting element 3 may be responsible for only a part of the phase adjustment for the light L2. As such, the processor 6, which is configured to control the light adjusting element 3, may transmit fewer electrical signals to the light adjusting element 3, and thus the computing of the processor 6 may be less complex and thus the data process speed of the processor 6 can be improved.

Figure 3:
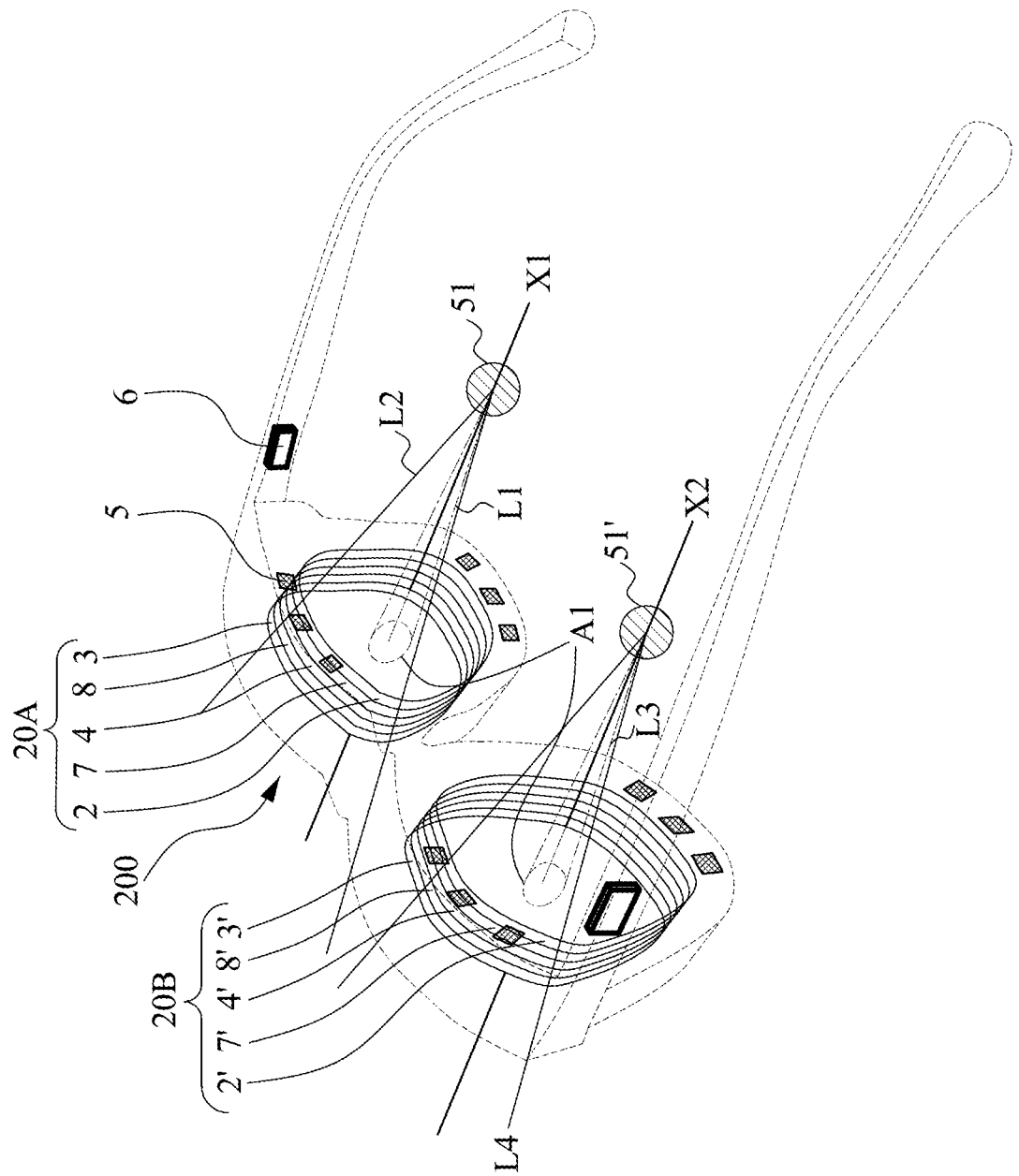
FIG. 3 is a 3D perspective view of an optical adaptive device in accordance with some embodiments of the present disclosure.

FIG. 3 is a 3D perspective view of an optical adaptive device 200 (or a wearable device) in accordance with some embodiments of the present disclosure. The optical adaptive device 200 may include a light adjusting module 20A and a light adjusting module 20B. The light adjusting module 20A may include the light adjusting element 2, the light adjusting element 3, the transparent panel 4, the eye tracking component 5, the processor 6, and the optical element 7. Similarly, the light adjusting module 20B may include components corresponding to the light adjusting module 20A. For example, the light adjusting module 20B may include a light adjusting element 2', a light adjusting element 3', a transparent panel 4', an eye tracking component 5', a processor 6', and an optical element 7'. The wearable device 200 may be a glass. The optical adaptive device 200 may be worn by a user. The user may have a visual area 51 and a visual area 51'. The visual areas 51 and 51' are a pair of optically sensitive organs of a body of the user.

As shown in FIG. 3, the light adjusting module 20A may have a central axis X1 therethrough. The article A1 within or on the transparent panel 4 may be located on the central axis X1. The light adjusting module 20B may have a central axis X2 therethrough. The article A1 within or on the transparent panel 4' may be located on the central axis X2. Furthermore, the light adjusting element 2 may be configured to focus the light L1 generated from the transparent panel 4 (e.g., the article A1) and may be configured to focus the light L2 passing through the transparent panel 4. The light adjusting element 2' may be configured to focus a light L3 generated from the transparent panel 4' (e.g., the article A1) and may be configured to focus a light L4 passing through the transparent panel 4'. The light L2 and the light L4 may be reflected by a physical object. The light adjusting element 2 may be configured to focus the light L1 and the light L2 on the visual area 51 and the light adjusting element 2' may be configured to focus the light L3 and the light L4 on the visual area 51'.

Figure 4:
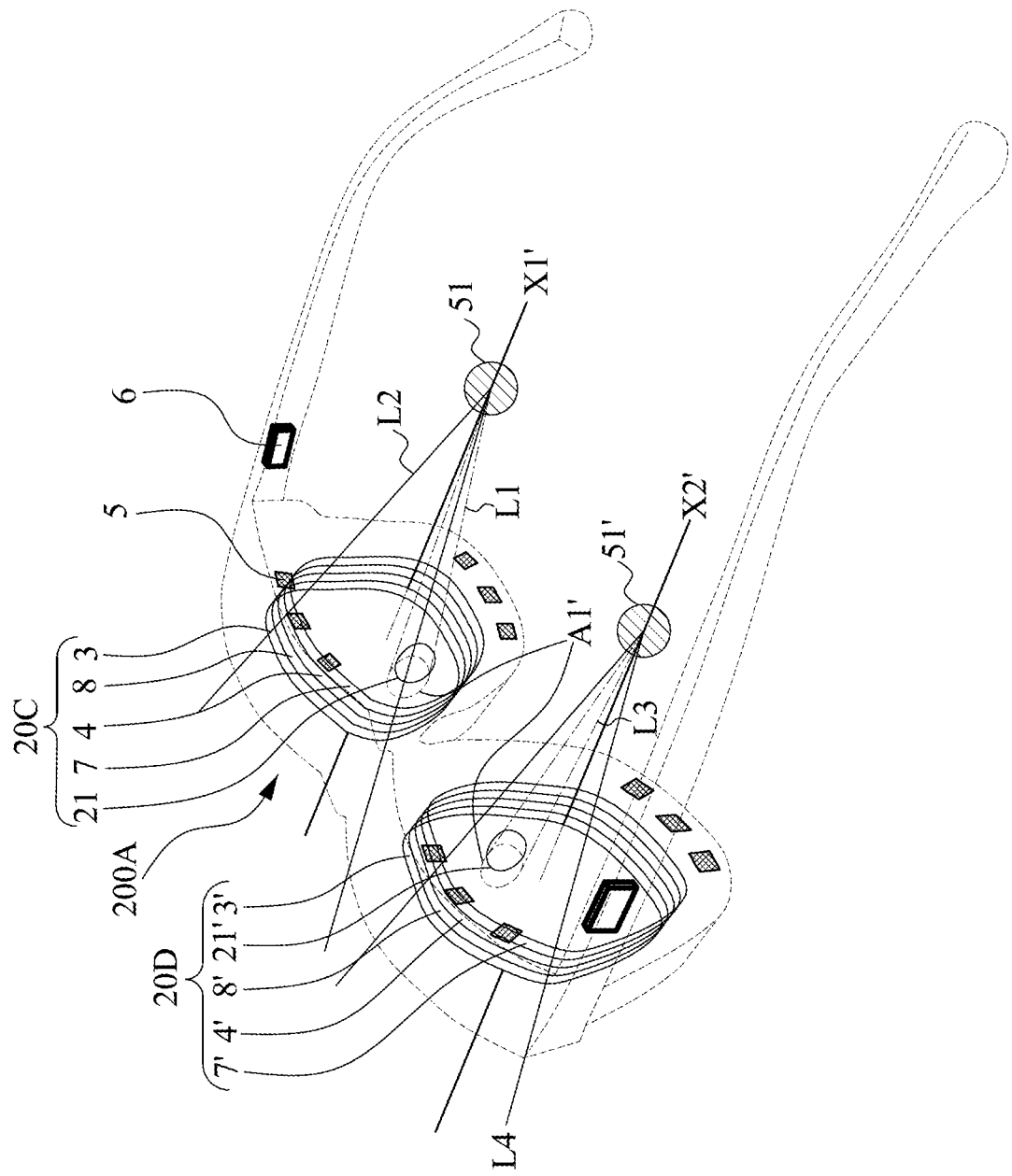
FIG. 4 is a 3D perspective view of an optical adaptive device in accordance with some embodiments of the present disclosure.

FIG. 4 is a 3D perspective view of an optical adaptive device 200A (or a wearable device) in accordance with some embodiments of the present disclosure. The optical adaptive device 200A of FIG. 4 may be similar to the optical adaptive device 200 of FIG. 3, with differences therebetween as follows.

As shown in FIG. 4, the optical adaptive device 200A may include a light adjusting module 20C and a light adjusting module 20D. The light adjusting module 20C may include a light adjusting element 21, the light adjusting element 3, and the transparent panel 4, the eye tracking component 5, the processor 6, and the optical element 7. Similarly, the light adjusting module 20D may include components corresponding to the light adjusting module 20C. For example, the light adjusting module 20B may include a light adjusting element 21', a light adjusting element 3', a transparent panel 4', an eye tracking component 5', a processor 6', and an optical element 7'. The optical adaptive device 200A may be a glass.

As shown in FIG. 4, the size of the light adjusting element 3 may be greater than the light adjusting element 21. The size of the light adjusting element 3' may be greater than the light adjusting element 21'. The size of the light adjusting element 2 and/or the light adjusting element 2' may correspond to the size of the article A1 on the transparent panel 4 or the transparent panel 4', such that the light adjusting elements 2 and 2' may be configured to change the characteristics (e.g., the path) of the light (e.g., the light L1 as illustrated in FIG. 2) generated by the article A1. In some embodiments, the size of the article A1 may be greater than that of the light adjusting elements 2 and 2'.

Referring again to FIG. 4, the light adjusting module 20C may have a central axis X1' therethrough. The article A1' within or on the transparent panel 4 may be shifted from the central axis X1'. The light adjusting element 21 may be shifted from the central axis X1'. The light adjusting module 20D may have a central axis X2' therethrough. The article A1 within or on the transparent panel 4' may be shifted from the central axis X2'. The light adjusting element 21' may be shifted from the central axis X2'. Furthermore, the light adjusting element 3 (or the light adjusting element 3') may be configured to allow the light L2 to be free from passing through the adjusting element 21 (or the light adjusting element 21').

The light adjusting element 21 may be mounted to the transparent panel 4 at various locations. The light adjusting element 21' may be attached to the transparent panel 4' at various locations.

The light adjusting element 2 may be configured to focus the light L1 generated from the transparent panel 4 (e.g., the article A1) and may be configured to focus the light L2 passing through the transparent panel 4. The light adjusting element 2' may be configured to focus a light L3 generated from the transparent panel 4' (e.g., the article A1) and may be configured to focus a light L4 passing through the transparent panel 4'. The light L2 and the light L4 may be reflected by a physical object. The light adjusting element 2 may be configured to focus the light L1 and the light L2 on the visual area 51 and the light adjusting element 2' may be configured to focus the light L3 and the light L4 on the visual area 51'.

FIG. 4 is a diagram of an optical adaptive method 300 in accordance with some embodiments of the present disclosure. The optical adaptive method 300 may include Steps 301, 303, 305, and 307.

In Step 301, a viewing focus of an eye of a user may be detected by, e.g., the optical adaptive device 100 of FIG. 1, the optical adaptive device 200 of FIG. 2 and FIG. 3, or the optical adaptive device 200A of FIG. 4. For example, the eye tracking component 5 may be configured to detect the viewing focus. The eye tracking component 5 may include a light emitter configured to emit a first wave. The first wave may be reflected by the user's eye to form second wave. The eye tracking component 5 may include a light sensor configured to receive the second wave. The optical adaptive device 100 (or the optical adaptive devices 200, 200A) may be configured to determine, based on the first wave and the second wave, at least one of: a location of the user's eye, a movement of the user's eye, or the viewing focus of the user's eye.

In Step 303, a first light (e.g., the light L1) associated with a visual image may be generated by, e.g., the transparent panel 4 and a phase or a path of the first light may be adjusted by, e.g., the light adjusting element 2.

In Step 305, a second light (e.g., the light L2) from a physical object may be received by the optical adaptive device 100 (or the optical adaptive devices 200, 200A) and a phase or a path of the second light may be adjusted by, e.g., the light adjusting element 3 and/or the light adjusting element 2.

In Step 307, the first light and the second light may be focused on the eye of the user. Furthermore, the first light and the second light may be focused in response to the viewing focus of the eye of the user. The lights from different articles (e.g., the first light and the second light) may be simultaneously focused on the eye of the user with the adjustment capability of the optical adaptive device 100 (or the optical adaptive devices 200, 200A). The phase of the first light may be compatible with the phase of the second light. As such, the user may see the image of the visual image and the physical object as if they are at the same location.

Persons of ordinary skill in the art would appreciate that the sequence of the optical adaptive method 300 can be varied in alternative embodiments.

Figure 5:
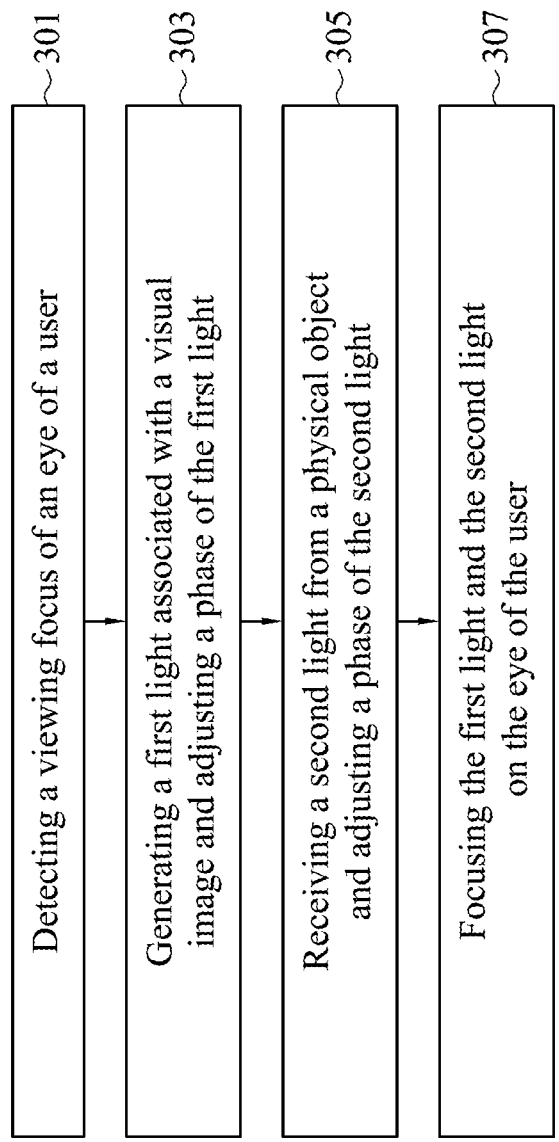
FIG. 5 is a diagram of an optical adaptive method in accordance with some embodiments of the present disclosure.
Figure 6:
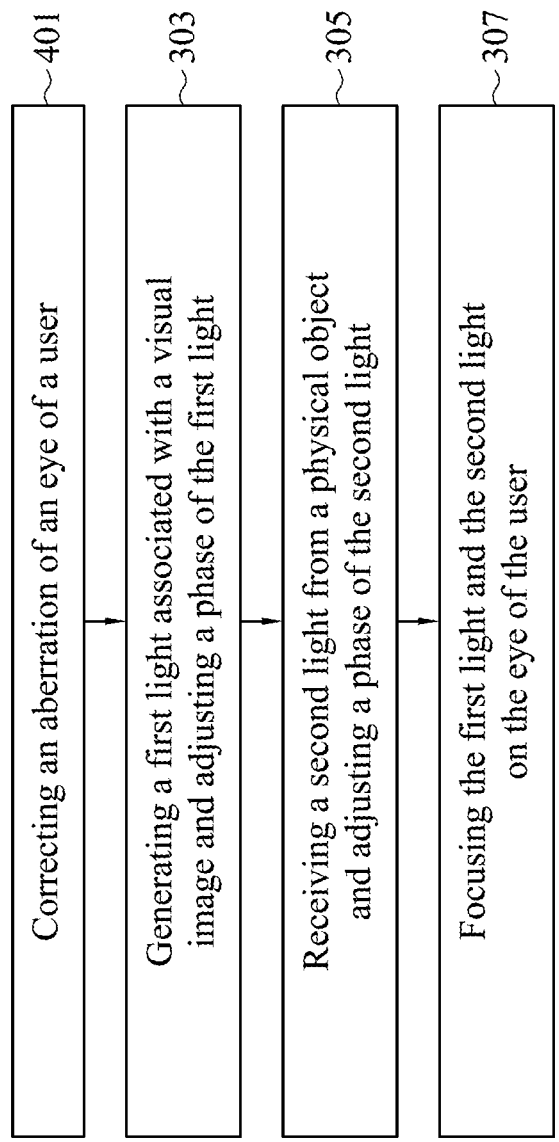
FIG. 6 is a diagram of an optical adaptive method in accordance with some embodiments of the present disclosure.

FIG. 5 is a diagram of an optical adaptive method 400 in accordance with some embodiments of the present disclosure. The optical adaptive method 400 of FIG. 5 is similar to the optical adaptive method 300 of FIG. 4, with differences therebetween as follows.

The optical adaptive method 400 may include Step 401 rather than Step 301 as illustrated in FIG. 4.

In Step 401, an aberration (or a disorder) of the eye of the user may be corrected by the optical adaptive device 100 (or the optical adaptive devices 200, 200A). For example, a viewing focus of the eye of the user or the wavefront of the light reflected from the eye of the user may be tracked by the eye tracking component 5. At least one of the light adjusting element 2 and/or the light adjusting element 3 may be controlled by the processor 6 in response to the information of the viewing focus or the wavefront of the reflected light of the eye. The phase or the direction of the light to be received by the user's eye may be adjusted by the light adjusting element 2 and/or the light adjusting element 3 to compensate for the aberration of the user's eye. As such, a user with some eye disorder (e.g., near-sightedness or far-sightedness) may directly use the optical adaptive device 100 without wearing a contact lens.

Persons of ordinary skill in the art would appreciate that the sequence of the optical adaptive method 400 can be varied in alternative embodiments.

Spatially relative terms, such as "beneath," "below," "lower," "above," "upper," "left," "right" and the like, may be used herein for ease of description to describe one element or feature's relationship to another element(s) or feature(s) as illustrated in the figures. The spatially relative terms are intended to encompass different orientations of the device in use or operation, in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

As used herein, the terms "approximately", "substantially", "substantial" and "about" are used to describe and account for small variations. When used in conduction with an event or circumstance, the terms can refer to instances in which the event or circumstance occurs precisely as well as instances in which the event or circumstance occurs to a close approximation. As used herein with respect to a given value or range, the term "about" generally means within ±10%, ±5%, ±1%, or ±0.5% of the given value or range. Ranges can be expressed herein as from one endpoint to another endpoint or between two endpoints. All ranges disclosed herein are inclusive of the endpoints unless specified otherwise. The term "substantially coplanar" can refer to two surfaces within micrometers (μm) of lying along the same plane, such as within 10 μm, within 5 μm, within 1 μm, or within 0.5 μm of lying along the same plane. When referring to numerical values or characteristics as "substantially" the same, the term can refer to the values lying within ±10%, ±5%, ±1%, or ±0.5% of an average of the values.

The foregoing outlines features of several embodiments and detailed aspects of the present disclosure. The embodiments described in the present disclosure may be readily used as a basis for designing or modifying other processes and structures for carrying out the same or similar purposes and/or achieving the same or similar advantages of the embodiments introduced herein. Such equivalent constructions do not depart from the spirit and scope of the present disclosure, and various changes, substitutions, and alterations may be made without departing from the spirit and scope of the present disclosure.

What is claimed is:

1. An optical adaptive device, comprising:
a carrier;
a first light adjusting element disposed in or on the carrier and configured to focus a first light from a first article on a visual area by adjusting a light path of the first light; and
a second light adjusting element disposed in or on the carrier and configured to focus a second light from a second article on the visual area by adjusting a light path of the second light;
wherein the first light adjusting element includes a first lens membrane defining a first cavity, and the first lens membrane is configured to be deformed by injecting a first fluid in the first cavity or releasing the first fluid from the first cavity, and
wherein the second light adjusting element includes a second lens membrane defining a second cavity, and the second lens membrane is configured to be deformed by injecting a second fluid in the second cavity or releasing the second fluid from the second cavity and is closer to the second article than the first lens membrane is.

2. The wearable device of claim 1, wherein the first light adjusting element functions as a concave lens when the first fluid is released from the first cavity.

3. The wearable device of claim 2, wherein a propagating speed of the first light through the first light adjusting element is altered after the first lens membrane is deformed.

4. The wearable device of claim 1, wherein the first lens membrane and the second lens membrane are collectively configured to adjust the second light.

5. The wearable device of claim 1, wherein a phase of the second light remains substantially the same before and after passing through the first light adjusting element.

6. The wearable device of claim 1, wherein a size of the second light adjusting element is greater than a size of the first light adjusting element.

7. The wearable device of claim 1, wherein a first central axis of the first light adjusting element is shifted from a second central axis of the second light adjusting element.

8. The wearable device of claim 1, wherein the first article is in a transparent panel contacting the first light adjusting element, and the first light from the first article passes through an interface between the transparent panel and the first light adjusting element.

9. An optical adaptive device, comprising:
a carrier;
a first light adjusting element disposed in or on the carrier and configured to focus a first light from a first article on a visual area by adjusting a light path of the first light; and a second light adjusting element disposed in or on the carrier and configured to focus a second light from a second article on the visual area by adjusting a light path of the second light;

wherein the first light adjusting element includes a first lens membrane defining a first cavity, and the first lens membrane is configured to be deformed by injecting a first fluid in the first cavity or releasing the first fluid from the first cavity, wherein the first light adjusting element functions as a concave lens when the first fluid is released from the first cavity;

wherein the second light adjusting element includes a second lens membrane defining a second cavity, and the second lens membrane is configured to be deformed by injecting a second fluid in the second cavity or releasing the second fluid from the second cavity and is closer to the second article than the first lens membrane is;

wherein a phase of the second light remains substantially the same before and after passing through the first light adjusting element;

wherein a size of the second light adjusting element is greater than a size of the first light adjusting element; and wherein the first article is in a transparent panel contacting the first light adjusting element, and the first light from the first article passes through an interface between the first article and the first light adjusting element.

* * * * *